United States Patent
Zhang et al.

(10) Patent No.: US 12,556,288 B2
(45) Date of Patent: Feb. 17, 2026

(54) INTEGRATED SOURCE GENERATION, TRANSMISSION, AND DISTRIBUTION SYSTEM BASED ON PHOTONIC LOOP

(71) Applicant: CHINA ELECTRONICS TECHNOLOGY GROUP CORPORATION NO 44 RESEARCH INSTITUTE, Chongqing (CN)

(72) Inventors: Hao Zhang, Chongqing (CN); Pengfei Qu, Chongqing (CN)

(73) Assignee: CHINA ELECTRONICS TECHNOLOGY GROUP CORPORATION NO 44 RESEARCH INSTITUTE, Chongqing (CN)

( * ) Notice: Subject to any disclaimer, the term of this patent is extended or adjusted under 35 U.S.C. 154(b) by 320 days.

(21) Appl. No.: 18/396,732

(22) Filed: Dec. 27, 2023

(65) Prior Publication Data

US 2025/0125883 A1   Apr. 17, 2025

(30) Foreign Application Priority Data

Oct. 16, 2023 (CN) .......................... 202311337531.5

(51) Int. Cl.
*H04B 10/2575* (2013.01)
*H04B 10/25* (2013.01)
*H04B 10/70* (2013.01)

(52) U.S. Cl.
CPC ....... *H04B 10/70* (2013.01); *H04B 10/25755* (2013.01); *H04B 10/25891* (2020.05)

(58) Field of Classification Search
CPC .............. H04B 10/25755; H04B 10/27; H04B 10/271; H04B 10/275; H04B 10/2755
See application file for complete search history.

(56) References Cited

U.S. PATENT DOCUMENTS 5,541,759 A * 7/1996 Neff ...................... H04B 10/275
  398/154
6,327,400 B1 * 12/2001 Harstead .............. H04B 10/275
  385/16

(Continued)

FOREIGN PATENT DOCUMENTS

CN          11934773         * 11/2020      ............. H04B 10/40

OTHER PUBLICATIONS

H. Kiuchi, "Bidirectional Optical Carrier Frequency Commonality Method for Optical Fiber Delay Measurement," in IEEE Photonics Technology Letters, vol. 34, No. 17, pp. 887-890, 1 Sep. 1, 2022, doi: 10.1109/LPT.2022.3190519. (Year: 2022).*

*Primary Examiner* — Nathan M Cors (57) ABSTRACT

An integrated source generation, transmission, and distribution system based on a photonic loop includes a central station unit and subscriber station units. The central station unit and the subscriber station units are connected to form the photonic loop. The central station unit transmits carrier radio frequency signals respectively into the photonic loop in a clockwise direction and a counterclockwise direction of the photonic loop, and receives the optical carrier radio frequency signals respectively transmitted in the clockwise direction and the counterclockwise direction to form a closed loop after an optical processing and an electrical processing. The central station unit stabilizes transmission delays of the photonic loop in combination with an external reference signal, and locks a frequency or a phase of microwave signals. The subscriber station units receive and process the optical carrier radio frequency signals to obtain first microwave frequency signals.

10 Claims, 4 Drawing Sheets

(56) References Cited

U.S. PATENT DOCUMENTS

| | | | | |
|---|---|---|---|---|
| 6,414,768 B1* | 7/2002 | Sakata | .................... | H04B 10/27 |
| | | | | 398/59 |
| 2006/0083512 A1* | 4/2006 | Wake | .................. | H04J 14/0307 |
| | | | | 398/59 |
| 2012/0321309 A1* | 12/2012 | Barry | .................... | H04L 45/745 |
| | | | | 398/51 |
| 2016/0173225 A1* | 6/2016 | Cavaliere | ............ | H04J 14/0287 |
| | | | | 398/7 |
| 2023/0142562 A1* | 5/2023 | Ujikawa | ............ | H04B 10/2755 |
| | | | | 398/5 |

* cited by examiner

INTEGRATED SOURCE GENERATION, TRANSMISSION, AND DISTRIBUTION SYSTEM BASED ON PHOTONIC LOOP

TECHNICAL FIELD

The present disclosure relates to a field of microwave photon technology, and in particular to an integrated source generation, transmission, and distribution system based on a photonic loop.

BACKGROUND

High-performance microwave frequency signals have important application value in fields of satellite navigation, aerospace, deep space exploration, geological surveying, mapping, and basic physical quantity measurement. With development of distributed network systems, transmission and distribution of microwave frequency signals are currently an inevitable choice. It is very urgent to study generation and distribution of high-fidelity and ultra-stable microwave frequency signals. Current research and projects independently consider three aspects of the microwave frequency signals: which are respectively frequency source generation, remote transmission distribution, and phase stabilization. Performance of remotely transmission networking of the high-performance frequency signals is limited by sources thereof, and lacks a systematic overall architecture design. Moreover, engineering applications of the high-performance frequency signals also need to further improve environmental adaptability thereof.

SUMMARY

In view of defects in the prior art, a problem solved by the present disclosure is to provides an integrated source generation, transmission, and distribution system based on a photonic loop.

To achieve the above object, the present disclosure provides the integrated source generation, transmission, and distribution system based on the photonic loop. The integrated source generation, transmission, and distribution system comprises a central station unit and subscriber station units. The central station unit comprises a first connection port and a second connection port. The subscriber station units are connected in series by optical fibers to form a single-fiber bidirectional optical transmission path. A first end of the single-fiber bidirectional optical transmission path is connected to the first connection port of the central station unit, and a second end of the single-fiber bidirectional optical transmission path is connected to the second connection port of the central station unit, so as to form the photonic loop. The photonic loop is a single-fiber bidirectional photonic loop.

The central station unit is configured to transmit a first optical carrier radio frequency signal into the photonic loop in a clockwise direction of the photonic loop and transmit a second optical carrier radio frequency signal into the photonic loop in a counterclockwise direction of the photonic loop. The central station unit is configured to receive the first optical carrier radio frequency signal transmitted in the clockwise direction and the second optical carrier radio frequency signal transmitted in the counterclockwise direction to form a closed loop after an optical processing and an electrical processing. A microwave signal is generated based on closed-loop oscillation of the photonic loop. The central station unit is configured to extract time delay information and phase information of the photonic loop from the microwave signal in combination with an external reference signal, stabilize transmission delays of the photonic loop, and lock a frequency or a phase of the microwave signal.

The subscriber station units are configured to receive and process the first optical carrier radio frequency signal transmitted in the clockwise direction and the second optical carrier radio frequency signal transmitted in the counterclockwise direction to obtain first microwave frequency signals through the optical processing and the electrical processing. Each of the first microwave frequency signals has a stable frequency, and phases of the first microwave frequency signals are synchronized.

In the present disclosure, the central station unit and the subscriber station units form the photonic loop. The central station unit generates the microwave signal through the closed-loop oscillation of the photonic loop, and extracts the time delay information and the phase information of the photonic loop through the microwave signal, thereby adjusting a time delay through the delay adjustment module to stabilize the transmission delays of the photonic loop. Each of the subscriber station units extracts the first optical radio frequency signal and the second optical radio frequency signal respectively transmitted in the clockwise direction and the counterclockwise direction from the photonic loop, and obtain a corresponding first microwave frequency signal through the optical processing and the electrical processing. Each of the first microwave frequency signals has a stable frequency, and phases of the first microwave frequency signals are synchronized. The first microwave frequency signals received by the subscriber station units have characteristics of phase stability and synchronization, thereby realizing the integrated source generation, transmission, and distribution system based on the photonic loop.

DETAILED DESCRIPTION

Figure 1:
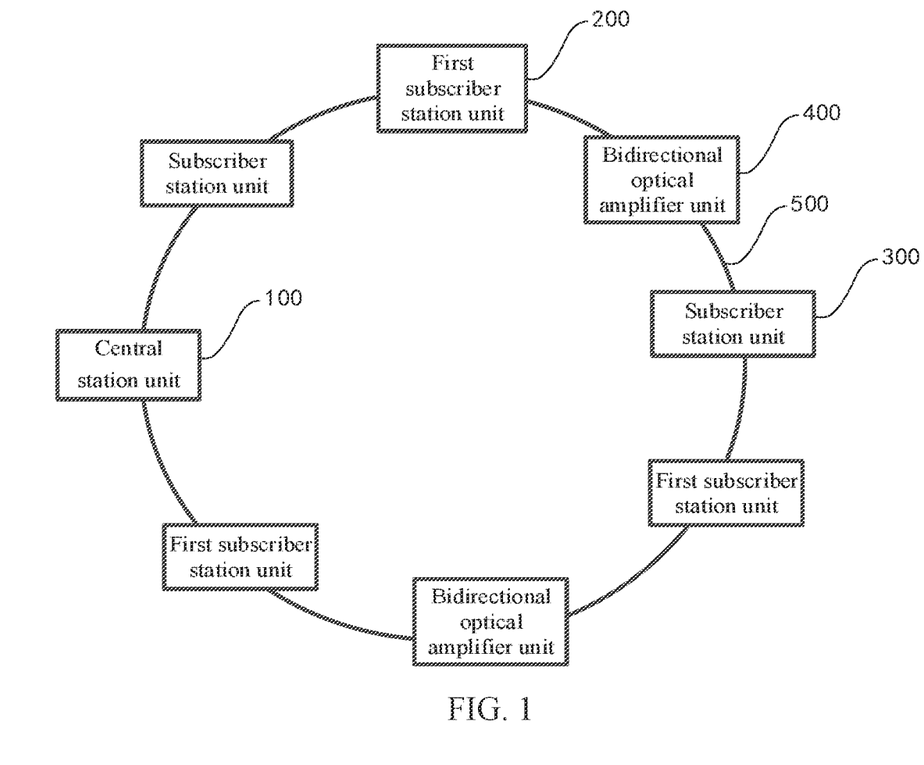
FIG. 1 is a block diagram of an integrated source generation, transmission, and distribution system based on a photonic loop of the present disclosure.

In one embodiment, as shown in FIG. 1, the present disclosure provides an integrated source generation, transmission, and distribution system based on a photonic loop. The integrated source generation, transmission, and distribution system comprises a central station unit 100 and subscriber station units.

The central station unit 100 comprises a first connection port and a second connection port. The subscriber station units are connected in series by optical fibers to form a single-fiber bidirectional optical transmission path. A first end of the single-fiber bidirectional optical transmission path is connected to the first connection port of the central station unit 100, and a second end of the single-fiber bidirectional optical transmission path is connected to the second connection port of the central station unit 100, so as to form the photonic loop 500. The photonic loop 500 is a single-fiber bidirectional photonic loop.

Of course, when the number of subscriber station units is large, bidirectional optical amplifier units 400 are disposed in the photonic loop 500. The number and installation positions of the bidirectional optical amplifier units 400 are determined arbitrarily according to actual needs. For example, one of the bidirectional optical amplifier units 400 is located between the central station unit 100 and an adjacent subscriber station unit and the other bidirectional optical amplifier units 400 are respectively located between corresponding two adjacent subscriber station units.

The central station unit 100 is configured to transmit a first optical carrier radio frequency signal into the photonic loop 500 in a clockwise direction of the photonic loop 500 and transmit a second optical carrier radio frequency signal into the photonic loop 500 in a counterclockwise direction of the photonic loop 500; the central station unit 100 is configured to receive the first optical carrier radio frequency signal transmitted in the clockwise direction and the second optical carrier radio frequency signal transmitted in the counterclockwise direction to form a closed loop after an optical processing and an electrical processing. A microwave signal is generated based on closed-loop oscillation of the photonic loop 500. The central station unit 100 is configured to extract time delay information and phase information of the photonic loop 500 from the microwave signal in combination with an external reference signal, stabilize transmission delays of the photonic loop 500, and lock a frequency or a phase of the microwave signal.

Figure 2:
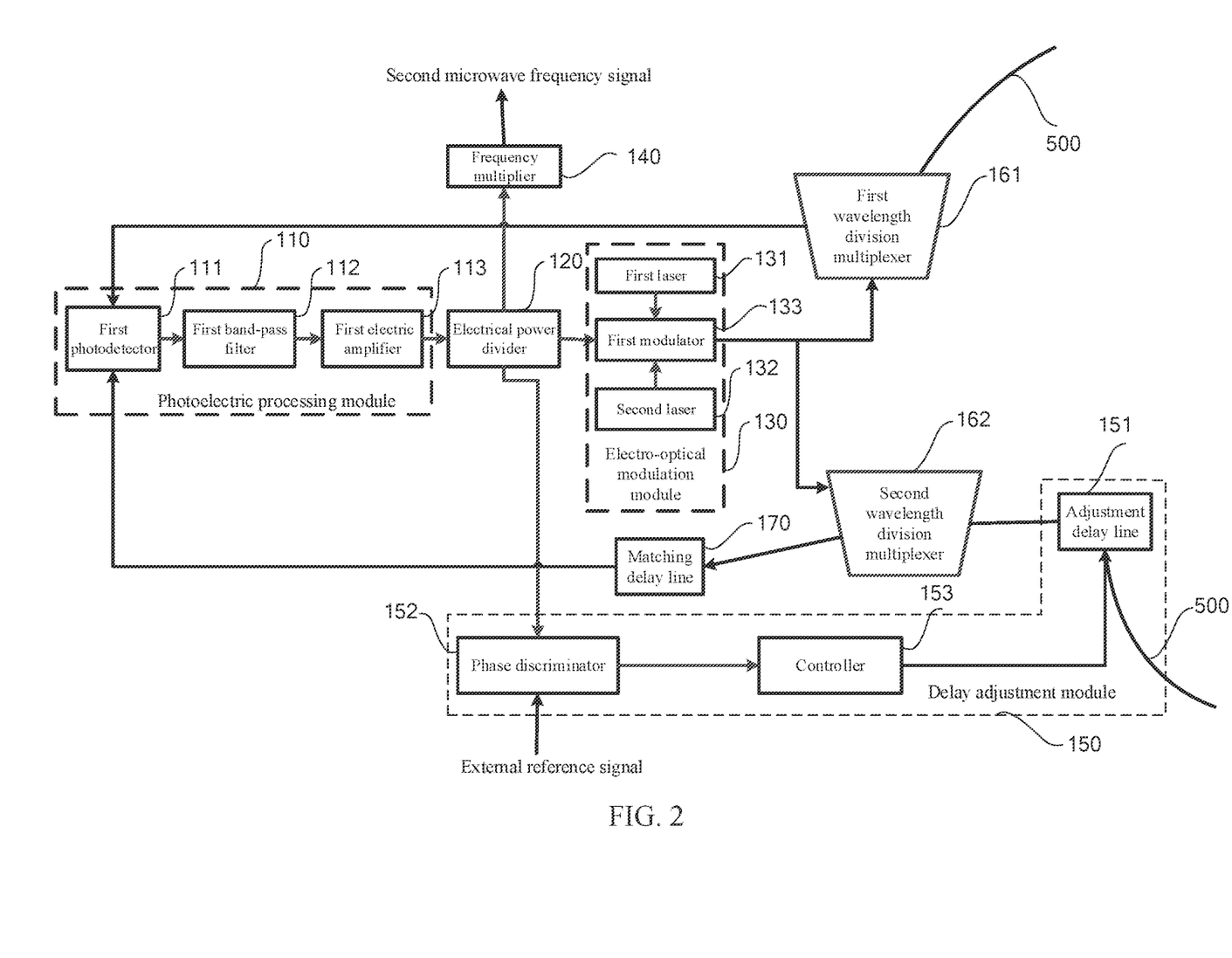
FIG. 2 is a block diagram of a central station unit of the present disclosure.

As shown in FIG. 2, the central station unit 100 comprises a photoelectric processing module 110, an electrical power divider 120, an electro-optical modulation module 130, a first wavelength division multiplexer 161, a second wavelength division multiplexer 162, a matching delay line 170, and a delay adjustment module 150.

The photoelectric processing module 110 is configured to sequentially perform photoelectric conversion, signal combining, filtering and amplification on the second optical carrier radio frequency signal received by the first wavelength division multiplexer 161 and the first optical carrier radio frequency signal received by the second wavelength division multiplexer 162, to obtain microwave transmission signals. Specifically, the photoelectric processing module 110 comprises a first photodetector 111, a first band-pass filter 112, and a first electric amplifier 113;

The first photodetector 111 is a balanced photodetector. A first input end of the first photodetector 111 is connected to an output end of the first wavelength division multiplexer 161, and the first photodetector 111 is configured to recover a second microwave recovery signal from the second optical carrier radio frequency signal from the first wavelength division multiplexer 161. A second input end of the first photodetector 111 is connected to an output end of the second wavelength division multiplexer 162, and the first photodetector 111 is configured to recover a first microwave recovery signal from the first optical carrier radio frequency signal from the second wavelength division multiplexer 162. The first photodetector 111 is further configured to combine the first microwave recovery signal and the second microwave recovery signal to output a combined microwave signal; An output end of the first photodetector 111 is connected to the first electric amplifier 113 through the first band-pass filter 112, The first band-pass filter 112 is configured to filter the combined microwave signal and output a filtered microwave signal; The first band-pass filter 112 is a first electrical filter with an adjustable center frequency, so as to facilitate generation, transmission and distribution of microwave signals of different frequencies according to requirements. The first electric amplifier 113 is configured to amplify the filtered microwave signal and output the microwave transmission signal.

The electrical power divider 120 comprises at least two output ports configured to divide the microwave transmission signals output by the photoelectric processing module 110 into at least two branch microwave transmission signals. A first output port of the at least two output ports of the electrical power divider 120 outputs a first branch microwave transmission signal to the electro-optical modulation module 130. The second output port of the at least two output ports of the electrical power divider 120 outputs a second branch microwave transmission signal to the delay adjustment module 150. In order to conveniently provide microwave radio frequency signals to the equipment inside the central station unit 100, in the embodiment, the electrical power divider 120 comprises three output ports configured to divide the microwave transmission signals output by the photoelectric processing module 110 into the first branch microwave transmission signal, the second branch microwave transmission signal, and a third branch microwave transmission signal. The central station unit 100 further comprises a frequency multiplier 140. An third output port of the electrical power divider 120 outputs the third branch microwave transmission signal to the frequency multiplier 140, The frequency multiplier doubles a frequency of the third branch microwave transmission signal to output a second microwave frequency signal. A frequency of the second microwave frequency signal is twice of a frequency of the microwave transmission signal. The second microwave frequency signal is transmitted to devices of the central station unit.

The electro-optical modulation module 130 is configured to modulate a first optical signal of a wavelength $\lambda_1$ (a first wavelength) by the first branch microwave transmission signal to output a first modulated optical signal. The electro-optical modulation module 130 is configured to modulate a second optical signal of a wavelength $\lambda_2$ (a second wavelength) by the first branch microwave transmission signal to output a second modulated optical signal.

The electro-optical modulation module 130 comprises a first laser 131, a second laser 132, and a first modulator 133.

The first laser 131 is configured to output the first optical signal of the wavelength $\lambda_1$.

The second laser 132 is configured to output the second optical signal of the wavelength $\lambda_2$.

The first modulator 133 comprises two input ends, An first input end of the first modulator 133 is connected to the first laser 131, a second input end of the first modulator 133 is connected to the second laser 132, and a modulation end of the first modulator 133 is connected to the first output port of the electrical power divider 120. Therefore, the first modulator 133 modulates the first optical signal of the wavelength $\lambda_1$ by the first branch microwave transmission signal to output the first modulated optical signal and modulates the second optical signal of the second wavelength by the first split microwave transmission signal to output the second modulated optical signal of the wavelength $\lambda_2$.

A common end of the first wavelength division multiplexer 161 serves as the first connection port of the central station unit 100 and is connected to the photonic loop 500, so the first wavelength division multiplexer 161 is configured to perform wavelength selection. Specifically, the first wavelength division multiplexer extracts the first optical carrier radio frequency signal having a wavelength of $\lambda_1$ from a third optical signal input from an input end of the first wavelength division multiplexer 161, outputs the first optical carrier radio frequency signal to the photonic loop 500 through the common end of the first wavelength division multiplexer 161, extract the second optical carrier radio frequency signal having a wavelength of $\lambda_2$ from a fourth optical signal received from the common end of the first wavelength division multiplexer 161, and output the second optical carrier radio frequency signal to the photoelectric processing module 110 through an output end of the first wavelength division multiplexer 161;

A common end of the second wavelength division multiplexer 162 is connected to the adjustment delay line 151, and the second wavelength division multiplexer 162 is configured to realize wavelength selection of a fifth optical signal and a sixth optical signal. The fifth optical signal is output from the photonic loop 500 and transmitted in the counterclockwise direction The sixth optical signal is received from the photon loop 500 and transmitted in the clockwise direction.

Specifically, the second wavelength division multiplexer 162 extracts the second optical carrier radio frequency signal from the fifth optical signal input from an input end of the second wavelength division multiplexer 162, outputs the second optical carrier radio frequency signal to the delay adjustment module 150 through the common end of the second wavelength division multiplexer 162, extracts the first optical carrier radio frequency signal from the six optical signal received from the common end of the second wavelength division multiplexer 162, and outputs the first optical carrier radio frequency signal to the photoelectric processing module 110 through an output end of the second wavelength division multiplexer 162.

A first end of the matching delay line 170 is connected to the output end of the second wavelength division multiplexer 162 and a second end of the matching delay line 170 is connected to the photoelectric processing module 110. The matching delay line 170 is configured to realize an additional delay of the second optical carrier radio frequency signal having the wavelength of $\lambda_1$, so that the photonic loop 500 has different transmission delays in the clockwise direction and the counterclockwise direction and dual-loop oscillation of the photonic loop 500 is formed, and the spurious characteristic of the microwave signal based on the Viener effect (Vernier caliper effect).

Of course, the matching delay line 170 may also be disposed between the output end of the first wavelength division multiplexer 161 and the photoelectric processing module 110 and the matching delay line 170 is configured to perform additional delay on the second optical carrier radio frequency signal with the wavelength of $\lambda_2$ received from the photonic loop 500, which also enables the photonic loop 500 to have different transmission delays in the clockwise direction and the counterclockwise direction, thereby forming dual-loop oscillation.

The delay adjustment module 150 is configured to extract the time delay information and the phase information along the photonic loop 500 from the second branch microwave transmission signal according to the external reference signal; the delay adjustment module 150 is configured to adjust delays or phases of the first optical carrier radio frequency signal and the second optical carrier radio frequency signal transmitted in the photonic loop 500 according to the time delay information and the phase information of the photonic loop 500, so that the transmission delays of the photonic loop 500 are kept stable.

The delay adjustment module 150 comprises an adjustable delay line 151, a phase discriminator 152, and a controller 153. A first end of the adjustable delay line 151 is connected to the common end of the second wavelength division multiplexer 162. Of course, in one optional embodiment, the adjustable delay line 151 may also be connected to the common end of the first wavelength division multiplexer 161, A second end of the adjustable delay line 151 serves as the second connection port of the central station unit 100 and is connected to the photonic loop 500, The adjustable delay line 151 is configured to adjust an optical path delay amount of the photonic loop 500. The phase discriminator 152 is configured to receive the second branch microwave transmission signal and the external reference signal from an outside of the central station unit 100. The phase discriminator 152 is configured to extract the time delay information and the phase information of the photonic loop 500 from the second branch microwave transmission signal according to the external reference signal. The controller 153 is configured to adjust a time delay of the adjustable delay line according to the time delay information and the phase information of the photonic loop 500 extracted by the phase discriminator 152, so that the transmission delays of the photonic loop 500 are kept stable.

The subscriber station units are configured to receive the first optical carrier radio frequency signal transmitted in the clockwise direction and the second optical carrier radio frequency signal transmitted in the counterclockwise direction. The first optical carrier radio frequency signal transmitted in the clockwise direction and the second optical carrier radio frequency signal transmitted in the counterclockwise direction process is processed through the optical processing and the electrical processing to obtain first microwave frequency signals. Each of the first microwave frequency signals has a stable frequency, phases of the first microwave frequency signals are synchronized.

All of the subscriber station units are first subscriber station units 200 that adopt an optical receiving mode, or all of the subscriber station units are second subscriber station units 300 that adopt an electrical receiving mode, or, the subscriber station units comprise the first subscriber station units that adopt the optical receiving mode and the second subscriber station units that adopts the electrical receiving mode.

Figure 3:
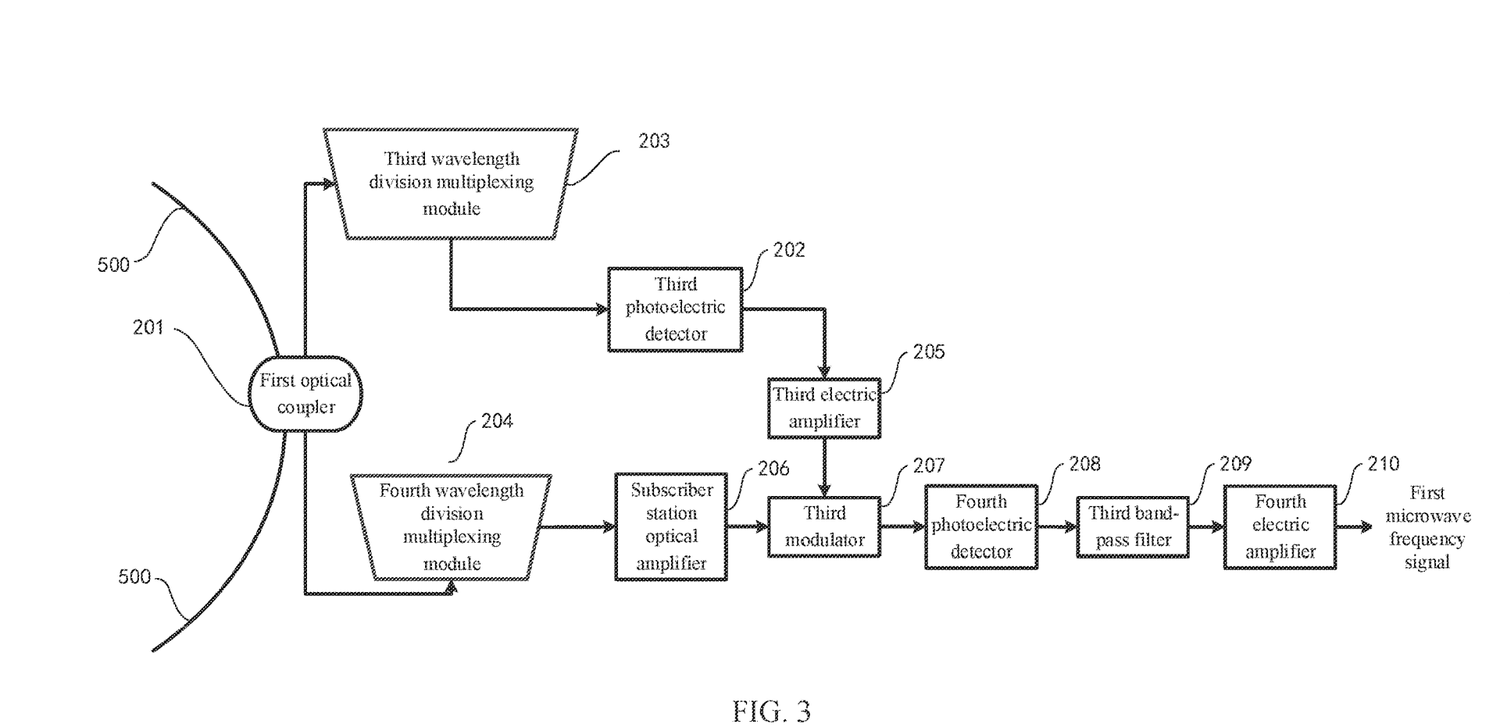
FIG. 3 is a block diagram of a first subscriber station unit of the present disclosure.

As shown in FIG. 3, each of the first subscriber station unit 200 comprises a first optical coupler 201, a third wavelength division multiplexing module 203, a third photoelectric detector 202, a third electric amplifier 205, a fourth wavelength division multiplexing module 204, a subscriber station optical amplifier 206, a third modulator 207, a fourth photoelectric detector 208, a third band-pass filter 209, and a fourth electric amplifier 210.

An input end of the first optical coupler 201 thereof is connected to the photonic loop 500. An output end of the first optical coupler 201 is connected to the third wavelength division multiplexing module 203 and the fourth wavelength division multiplexing module 204.

The first optical coupler 201 is configured to couple the first optical carrier radio frequency signal and the second optical carrier radio frequency signal from the photonic loop 500 and output to the third wavelength division multiplexing module 203 and the fourth wavelength division multiplexing module 204.

An output end of the third wavelength division multiplexing module 203 is connected to a third photoelectric detector 202. The third wavelength division multiplexing module 203 is configured to extract a first optical carrier radio frequency signal from the optical signal output by the first optical coupler 201, and is configured to recover the microwave signal as a microwave modulated signal through the third photodetector 202.

The third photoelectric detector 202 thereof is connected to a radio frequency port of a third modulator 207 thereof by the third electric amplifier 205 thereof. The third electric amplifier 205 is configured to amplify the microwave modulated signal to obtain a microwave modulated amplified signal as a modulated signal of the third modulator 207.

An output end of the fourth wavelength division multiplexing module 204 is connected to an input port of the third modulator 207 by the subscriber station optical amplifier 206. The fourth wavelength division multiplexing module 204 is configured to extract the second optical carrier radio frequency signal from the optical signal output by the first optical coupler 201, and amplify it through the subscriber station optical amplifier 206 to obtain an amplified optical carrier signal and transmitted it to the third modulator 207. Of course, in other embodiments, the third wavelength division multiplexing module 203 may be configured to extract the second optical carrier radio frequency signal from the optical signal output by the first optical coupler 201. At this time, the four wavelength multiplexing module 204 is configured to extract the first optical carrier radio frequency signal from the optical signal output by the first optical coupler 201.

The third modulator 207 is configured to modulate the amplified optical carrier signal through the microwave modulated amplified signal to obtain a modulated optical carrier signal. An output port of the third modulator 207 is connected to the fourth photoelectric detector 208, The fourth photodetector 208 is configured to recover the microwave signal from the modulated optical carrier signal, thereby obtaining a third microwave frequency signal having a frequency twice of the frequency of the microwave transmission signal.

The fourth photodetector 208 is connected to the fourth electric amplifier 210 through the third band-pass filter 209. The third band-pass filter 209 is configured to filter the third microwave frequency signal. The third band-pass filter 209 is a second electrical filter with an adjustable center frequency to facilitate the generation, transmission, and distribution of the microwave signal of different frequencies according to needs. The fourth electric amplifier 210 is configured to amplify the filtered third microwave frequency signal, and output the first microwave frequency signal that is amplified to the devices of the one of the first subscriber station units.

Figure 4:
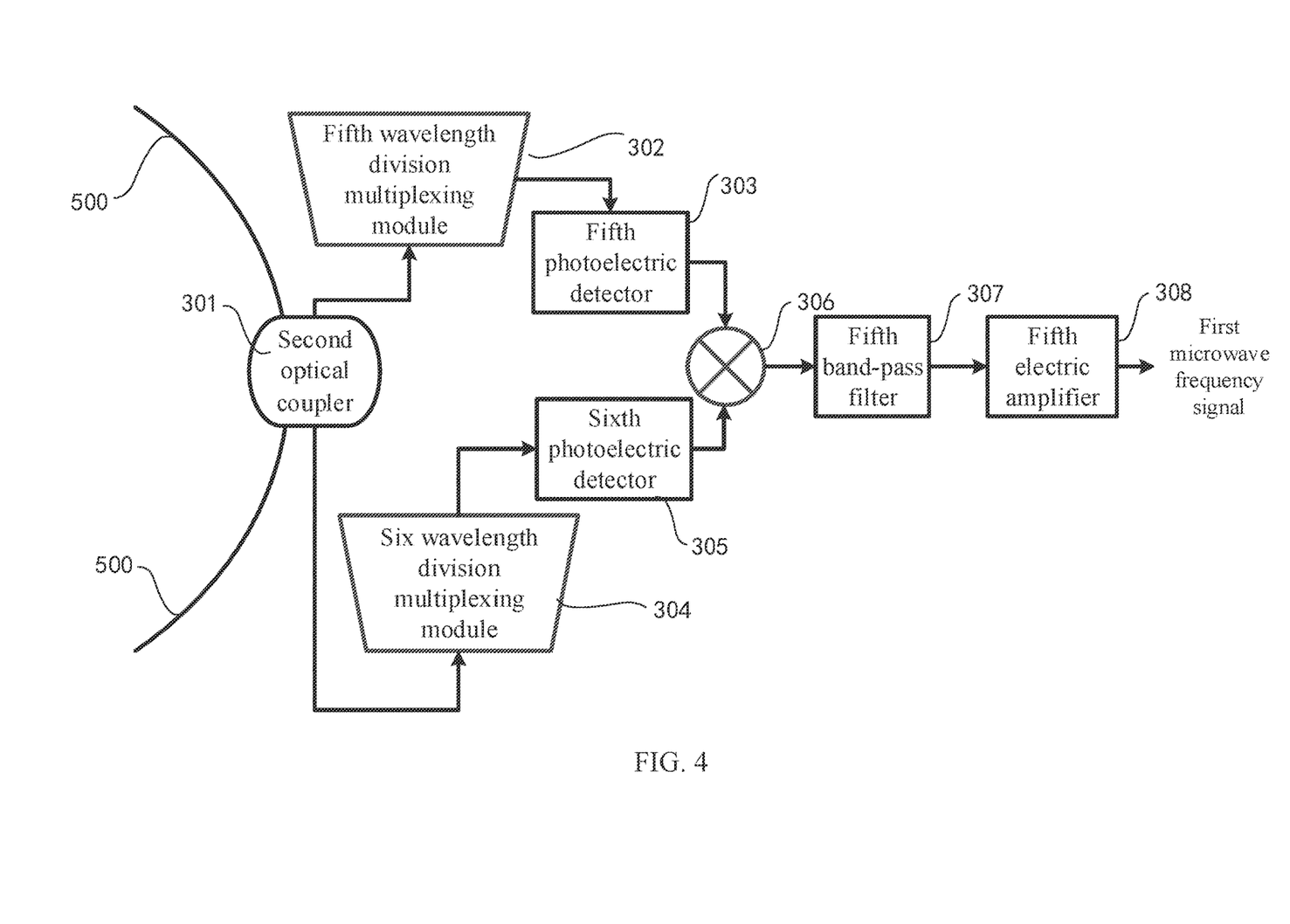
FIG. 4 is a block diagram of a second subscriber station unit of the present disclosure.

As shown in FIG. 4, each of the second subscriber station units 300 comprises a second optical coupler 301, a fifth wavelength division multiplexing module 302, a fifth photoelectric detector 303, a sixth wavelength division multiplexing module 304, a sixth photoelectric detector 305, a frequency mixer 306, a fifth band-pass filter 307, and a fifth electric amplifier 308. For better understanding, the present disclosure hereby takes one of the second subscriber station units 300 for illustration.

An input end of the second optical coupler 301 is connected to the photonic loop 500. An output end of the second optical coupler 301 is connected to the fifth wavelength division multiplexing module 302 and the sixth wavelength division multiplexing module 304. The second optical coupler 301 is configured to couple and output the first optical carrier radio frequency signal and the second optical carrier radio frequency signal from the photonic loop 500 to the fifth wavelength division multiplexing module 302 and the sixth wavelength division multiplexing module 304.

An output end of the fifth wavelength division multiplexing module 302 is connected to the fifth photoelectric detector 303. The fifth wavelength division multiplexing module 302 is configured to extract the first optical carrier radio frequency signal from the optical signal output by the second optical coupler 301, and recover the microwave signal as a first mixed frequency signal through the fifth photodetector 303. An output end of the sixth wavelength division multiplexing module 304 is connected to the sixth photoelectric detector 305. The sixth wavelength division multiplexing module 304 is configured to extract a second optical carrier radio frequency signal from the optical signal output by the second optical coupler 301, and is configured to recover the microwave signal as a second mixed frequency signal through the sixth photodetector 305.

An output end of the fifth photoelectric detector 303 and an output end of the sixth photoelectric detector 305 are respectively connected to two input ports of the frequency mixer 306. The frequency mixer 306 is configured to mix the first mixed signal and the second mixed signal to obtain a fourth microwave frequency signal having the frequency twice of the frequency of the microwave transmission signal.

An output end of the frequency mixer 306 is connected to the fifth electric amplifier 308 by the fifth band-pass filter 307. The fifth band-pass filter 307 is configured to filter the fourth microwave frequency signal. The fifth band-pass filter 307 is a third electrical filter with an adjustable center frequency to facilitate generation, transmission, and distribution of the microwave signal of different frequencies according to needs. The fifth electric amplifier 308 is configured to amplify a filtered fourth microwave frequency signal to output the first microwave frequency signal that is amplified to the devices of the one of the second subscriber station units.

A working principle of the central station unit 100 is as follow:

As shown in FIGS. 1 and 2, a laser light (the first optical signal) having the wavelength of $\lambda_1$ and generated by the first laser 131 and a laser light (the second optical signal) having the wavelength of $\lambda_2$ generated by the second laser 132 are modulated by the microwave signal in the first modulator 133 to form the optical carrier radio frequency signals, where the optical radio frequency signals comprise the first optical carrier radio frequency signal and the second optical carrier radio frequency signal. An expression of the microwave signal $V_1$ is as follows:

$$V_1 \propto \cos\left(\frac{1}{2}\omega t + \theta_0\right) \tag{1}$$

ω represents a frequency of the microwave signal $V_1$. $\theta_0$ is a phase of the microwave signal.

Then, the optical radio frequency signals are divided into two paths. The first optical carrier radio frequency signal undergoes wavelength selection through the first wavelength division multiplexer 161. The first optical carrier radio frequency signal having the wavelength of $\lambda_1$ is extracted and input into the photonic loop 500, and is transmitted in the clockwise direction, and is transmitted through the adjustable delay line 151 for delay adjustment before transmitting to the second wavelength division multiplexer 162. The second optical carrier radio frequency signal undergoes wavelength selection through the second wavelength division multiplexer 162. The second optical carrier radio frequency signal having the wavelength of $\lambda_2$ is extracted, is transmitted through the adjustable delay line 151 for delay adjustment, is input into the photonic loop 500, and is transmitted in the counterclockwise direction. When bidirectional optical amplifier units are disposed in the photonic loop 500, the optical carrier radio frequency signals are compensated for optical power by the bidirectional optical amplifier units during transmission.

The first optical carrier radio frequency signal and the second optical carrier radio frequency signal are transmitted along the photon ring 500 for one round, and then return to the central station unit 100, and are sent to the first wavelength division multiplexer 161 and the second wavelength division multiplexer 162 for wavelength selection.

The first optical carrier radio frequency signal is extracted through the second wavelength division multiplexer 162, sent to the matching delay line 170 for additional delay, and then output to the first photodetector 111 for microwave signal recovery to obtain the first microwave recovery signal $V_2$. The first wavelength division multiplexer 161 performs the wavelength selection and extracts the second optical carrier radio frequency signal and sends the second optical carrier radio frequency signal to the first photodetector 111 for microwave signal recovery to obtain the second microwave recovery signal $V_2'$. Expressions of the first microwave recovered signal $V_2$ and the second microwave recovered signal $V_2'$ are as follows:

$$V_2 \propto \cos\left[\frac{1}{2}\omega t(t - \tau - \tau_{WDM11} - \tau_{WDM21} - \tau_{VODL} - \tau_{PD1}) + \theta_0\right] \quad (2)$$

$$V_2' \propto \cos\left[\frac{1}{2}\omega t(t - \tau - \tau_m - \tau_{VODL} - \tau_{WDM22} - \tau_{WDM12} - \tau_{PD2}) + \theta_0\right] \quad (3)$$

$\tau$ is an delay amount of the photonic loop 500. $\tau_m$ is a length of the matching delay line 170. $\tau_{VODL}$ is a delay amount of the adjustable delay line 151. $\tau_{WDM11}$ is a delay amount of the first optical carrier radio frequency signal in the first wavelength division multiplexer 161. $\tau_{WDM21}$ is a delay amount of the first optical carrier radio frequency signal in the in the second wavelength division multiplexer 162. $\tau_{WDM12}$ is a delay amount of the second optical carrier radio frequency signal in the first wavelength division multiplexer 161. $\tau_{WDM22}$ is the delay amount of the second optical carrier radio frequency signal in the second wavelength division multiplexer 162. $\tau_{WDM12}$ is a delay amount of the first optical carrier radio frequency signal in the first photodetector 111. $\tau_{PD2}$ is a delay amount of the second optical carrier radio frequency signal in the first photodetector 111.

The first microwave recovery signal $V_2$ and the second microwave recovery signal $V_2'$ are combined in the first photodetector 111 to obtain the combined microwave signal. An expression of the combined microwave signal is as follows:

$$V_3 \propto \cos\left[\frac{1}{2}\omega t - \frac{1}{4}\omega(2\tau + \tau_m + 2\tau_{VODL} + \right. \quad (4)$$
$$\left. \tau_{WDM22} + \tau_{WDM12} + \tau_{PD2} + \tau_{WDM11} + \tau_{WDM21} + \tau_{PD1}) + \theta_0\right]$$

The combined microwave signal $V_3$ is first input into the first band-pass filter 112 for electrical filtering, and a center frequency of the first band-pass filter 112 is ½ω. The filtered microwave signal obtained after filtering is amplified by the first electric amplifier 113 to obtain the microwave transmission signal. The microwave transmission signal is divided into three paths through the electrical power divider 120. An expression of the first branch microwave transmission signal $V_4$ is as follows:

$$V_4 \propto \quad (5)$$
$$\cos\left[\frac{1}{2}\omega t - \frac{1}{4}\omega(2\tau + \tau_m + 2\tau_{VODL} + \tau_{WDM22} + \tau_{WDM12} + \tau_{PD2} + \tau_{WDM11} + \right.$$
$$\left. \tau_{WDM21} + \tau_{PD1} + 2\tau_{BPF} + 2\tau_{LNA} + 2\tau_{PS1}) + \theta_0\right]$$

$\tau_{BPF}$ is a delay amount of the first band-pass filter 112. $\tau_{LNA}$ is a delay amount of the first electric amplifier 113. $\tau_{PS1}$ is a delay amount of the electrical power divider when the signal is output from the first output port of the electrical power divider. Only when $V_4$ and $V_1$ are in-phase, the photonic loop 500 oscillates to generate the microwave signal; therefore, $V_4$ needs to satisfy following conditions:

$$\omega(2\tau + \tau_m + 2\tau_{VODL} + \tau_{WDM22} + \tau_{WDM12} + \tau_{PD2} + \quad (6)$$
$$\tau_{WDM11} + \tau_{WDM21} + \tau_{PD1} + 2\tau_{BPF} + 2\tau_{LNA} + 2\tau_{PS1}) = 8k\pi$$

k is an integer.

Since the optical fibers are affected by external environments such as temperature and vibration, the transmission delays of the photonic loop 500 change with changes in the external environment. In order to realize a stable output of the microwave signal from the central station unit 100 and the subscriber station units, the phase of the second branch microwave transmission signal output from the second output port of the electrical power divider of the central station unit 100 is discriminated with the phase of the external reference signal. Under a condition of satisfying the equation: (6), the second branch microwave transmission signal $V_5$ is expressed as:

$$V_5 \propto \quad (7)$$
$$\cos\left[\frac{1}{2}\omega t - \frac{1}{4}\omega(2\tau + \tau_m + 2\tau_{VODL} + \tau_{WDM22} + \tau_{WDM12} + \tau_{PD2} + \tau_{WDM11} + \right.$$
$$\left. \tau_{WDM21} + \tau_{PD1} + 2\tau_{BPF} + 2\tau_{LNA} + 2\tau_{PS2}) + \theta_0\right]$$

$\tau_{PS2}$ is a delay amount of the electrical power divider when the second branch microwave transmission signal is output from the second output port of the electrical power divider. By adjusting the adjustable delay line 151, the following expression is established $$\tau + \tau_{VODL} = c \quad (8)$$

c is a constant. Therefore, the transmission delays of the photonic loop 500 are stabilized by adjusting the adjustable delay line 151, so as to lock the frequency and the phase of the microwave signal that is generated.

When the conditions of equations (6) and (8) are met, the third branch microwave transmission signal $V_6$ output from the third output port of the electrical power divider is expressed as:

$$V_6 \propto \cos\left[\frac{1}{2}\omega t - \frac{1}{4}\omega(\tau_m + \tau_{WDM22} + \tau_{WDM12} + \tau_{PD2} + \tau_{WDM11} + \tau_{WDM21} + \tau_{PD1} + 2\tau_{BPF} + 2\tau_{LNA} + 2\tau_{PS3} + 2c) + \theta_0\right] = \cos\left(\frac{1}{2}\omega t - \frac{1}{2}\varphi\right) \quad (9)$$

$\tau_{PS3}$ is a delay amount of the electrical power divider when the third branch microwave transmission signal is output from the third output port of the electrical power divider. φ is a constant, and a calculation formula of φ is as follows:

$$\varphi = \frac{1}{2}\omega(\tau_m + \tau_{WDM22} + \tau_{WDM12} + \tau_{PD2} + \tau_{WDM11} + \tau_{WDM21} + \tau_{PD1} + 2\tau_{BPF} + 2\tau_{LNA} + 2\tau_{PS3} + 2c) - 2\theta_0 \quad (10)$$

After the third branch microwave transmission signal $V_6$ is doubled by the frequency multiplier 140, the second microwave frequency signal $V_7$ output is expressed as:

$$V_7 \propto \cos\left[\omega t - \frac{1}{2}\omega(\tau_m + \tau_{WDM22} + \tau_{WDM12} + \tau_{PD2} + \tau_{WDM11} + \tau_{WDM21} + \tau_{PD1} + 2\tau_{BPF} + 2\tau_{LNA} + 2\tau_{PS3} + 2c) + 2\theta_0\right] = \cos(\omega t - \varphi) \quad (11)$$

The second microwave frequency signal $V_7$ is synchronized with the first microwave frequency signals finally output by the subscriber station units. The present disclosure takes the one of the second subscriber station units 300 as an example to illustrate working principles of the subscriber station units:

As shown in FIG. 4, the one of the second subscriber station units 300 extracts the optical carrier radio frequency signals transmitted in the clockwise direction and the counterclockwise direction of the photonic loop 500 through the second optical coupler 301. The optical carrier radio frequency signals respectively undergo the wavelength selection through the fifth wavelength division multiplexer and the sixth wavelength division multiplexer, and then the first optical carrier radio frequency signal transmitted in the clockwise direction and the second optical carrier radio frequency signal transmitted in the counterclockwise direction are extracted. Through the fifth detector and the sixth detection respectively perform the microwave signal recovery on the first optical carrier radio frequency signal transmitted in the clockwise direction and the second optical carrier radio frequency signal transmitted in the counterclockwise direction to obtain the first mixed frequency signal and the second mixed frequency signal. The expressions of the first mixed frequency signal $V_8$ and the second mixed frequency signal $V_8'$ are as follows:

$$V_8 \propto \cos\left[\frac{1}{2}\omega(t - \tau_1 - \tau_{WDM11} - \tau_{WDM51} - \tau_{PD5}) + \theta_0\right] \quad (12)$$

$$V_8' \propto \cos\left[\frac{1}{2}\omega(t - \tau_2 - \tau_{VODL} - \tau_{WDM22} - \tau_{WDM62} - \tau_{PD6}) + \theta_0\right] \quad (13)$$

$\tau_1$ is a fiber delay amount of the first optical carrier radio frequency signal from the central station unit 100 to the one of the second subscriber station units 300 in the clockwise direction. $\tau_2$ is a fiber delay amount of the second optical carrier radio frequency signal from the central station unit 100 to the one of the second subscriber station units 300 in the counterclockwise direction. $\tau_{WDM51}$ is a delay amount of the first optical carrier radio frequency signal in the fifth wavelength division multiplexer. $\tau_{WDM62}$ is a delay amount of the second optical carrier radio frequency signal in the sixth wavelength division multiplexer. $\tau_{PD5}$ is a delay amount of the first optical carrier radio frequency signal in the fifth detector. $\tau_{PD6}$ is a delay amount of the second optical carrier radio frequency signal in the sixth detector.

Since $\tau_1$ and $\tau_2$ are respectively the fiber delay amount of the central station unit 100 to the second subscriber station unit 300 in the clockwise direction and the fiber delay amount of the central station unit 100 to the second subscriber station unit 300 in the counterclockwise directions, it can be obtained that $\tau_1+\tau_2=\tau$. That is, a sum of the delay amount of the first optical carrier radio frequency signal and the delay amount of the second optical carrier radio frequency signal from the central station unit 100 to the one of the second subscriber station units 300 is exactly the delay amount of the photonic loop 500.

The first mixed frequency signal $V_8$ and the second mixed frequency signal $V_8'$ are mixed to obtain the fourth microwave frequency signal $V_9$ having the frequency twice of the frequency of the microwave transmission signal. An expression of $V_9$ is as follows:

$$V_9 \propto \cos\left[\frac{1}{2}\omega(2t - \tau_1 - \tau_{WDM11} - \tau_{WDM51} - \tau_{PD5} - \tau_2 - \tau_{VODL} - \tau_{WDM22} - \tau_{WDM62} - \tau_{PD6}) + 2\theta_0\right] = \cos\left[\frac{1}{2}\omega(2t - c - \tau_{WDM11} - \tau_{WDM51} - \tau_{PD5} - \tau_{WDM22} - \tau_{WDM62} - \tau_{PD6}) + 2\theta_0\right] \quad (14)$$

It can be seen that based on the photonic loop, an impact of a relative positional relationship between the one of the second subscriber station units and the central station unit 100 on the transmission delay is eliminated. After the fourth microwave frequency signal $V_9$ is filtered by the fifth band-pass filter 307 and amplified by the fifth electric amplifier 308 in sequence, the first microwave frequency signal having a stable phase is provided for the one of the second subscriber station units. The expression of the first microwave frequency signal is as follows:

$$V_{10} \propto \cos\left[\frac{1}{2}\omega(2t - \tau_1 - \tau_{WDM11} - \tau_{WDM51} - \tau_{PD5} - \tau_2 - \tau_{VODL} - \tau_{WDM22} - \tau_{WDM62} - \tau_{PD6} - 2\tau_{BPF5} - 2\tau_{LNA5}) + 2\theta_0\right] = \cos\left[\frac{1}{2}\omega(2t - c - \tau_{WDM11} - \tau_{WDM51} - \tau_{PD5} - \tau_{WDM22} - \tau_{WDM62} - \tau_{PD6} - 2\tau_{BPF5} - 2\tau_{LNA5}) + 2\theta_0\right] \quad (15)$$

$\tau_{BPF5}$ is a delay amount of the fifth band-pass filter 307, and $\tau_{LNA5}$ is the delay amount of the fifth electrical amplifier 308.

It can be seen from equation (15) that when a total delay amount formed by each of the second subscriber station units 300 on the corresponding first microwave frequency signal $V_{10}$ is a constant (such as a constant m), that is, when the following formula is satisfied: the phases of first microwave frequency signals $V_{10}$ output by the second subscriber station units 300 are consistent, thereby achieving phase synchronization of each of the second subscriber station units 300.

$$\tau_{WDM51} + \tau_{PD5} + \tau_{WDM62} + \tau_{PD6} + 2\tau_{BPF5} + 2\tau_{LNA5} = m \quad (16)$$

When a value of the constant m satisfies the following formula, the phase of the first microwave frequency signal $V_{10}$ output by each of the second subscriber station units 300 is consistent with the second microwave frequency signal $V_7$ output by the central station unit 100, so the phase synchronization of the central station unit 100 and each of second subscribe station units 300 is realized.

Similarly, when a total delay amount of the first microwave frequency signals output by the first subscriber station units 200 is a constant m, the phase of the first microwave frequency signal $V_7$ output by each of the first subscriber station units 200 is same as the phase of the first microwave frequency signal $V_{10}$ output by each of the second subscriber station units 200. The phases of the first and second microwave frequency signals are consistent, thereby achieving phase synchronization between the central station unit 100, each of the first subscriber station units 200 and each of the second subscriber station units 300.

In the embodiment, the central station unit 100 and the subscriber station units form the photonic loop 500. The central station unit 100 generates the microwave signal through the closed-loop oscillation of the photonic loop 500, and extracts the time delay information and the phase information of the photonic loop through the microwave signal, thereby adjusting a time delay through the delay adjustment module to stabilize the transmission delays of the photonic loop. Each of the subscriber station units extracts the first optical radio frequency signal and the second optical radio frequency signal respectively transmitted in the clockwise direction and the counterclockwise direction from the photonic loop, and obtain a corresponding first microwave frequency signal through the optical processing and the electrical processing. Each of the first microwave frequency signals of the subscriber station units has the stable frequency, and the phases of the first microwave frequency signals are synchronized. The first microwave frequency signals received by the subscriber station units have a characteristics of phase stability and synchronization; thereby realizing the integrated source generation, transmission, and distribution system based on the photonic loop 500.

What is claimed is:

1. An integrated source generation, transmission, and distribution system based on a photonic loop; comprising: a central station unit and subscriber station units,
    wherein the central station unit comprises a first connection port and a second connection port; and the subscriber station units are connected in series by optical fibers to form a single-fiber bidirectional optical transmission path; a first end of the single-fiber bidirectional optical transmission path is connected to the first connection port of the central station unit, and a second end of the single-fiber bidirectional optical transmission path is connected to the second connection port of the central station unit, so as to form the photonic loop; the photonic loop is a single-fiber bidirectional photonic loop;
    wherein the central station unit is configured to transmit a first optical carrier radio frequency signal into the photonic loop in a clockwise direction of the photonic loop and transmit a second optical carrier radio frequency signal into the photonic loop in a counterclockwise direction of the photonic loop; the central station unit is configured to receive the first optical carrier radio frequency signal transmitted in the clockwise direction and the second optical carrier radio frequency signal transmitted in the counterclockwise direction to form a closed loop after an optical processing and an electrical processing; a microwave signal is generated based on closed-loop oscillation of the photonic loop; the central station unit is configured to extract time delay information and phase information of the photonic loop from the microwave signal in combination with an external reference signal, is configured to stabilize transmission delays of the photonic loop, and is configured to lock a frequency or a phase of the microwave signal;
    the subscriber station units are configured to receive and process the first optical carrier radio frequency signal transmitted in the clockwise direction and the second optical carrier radio frequency signal transmitted in the counterclockwise direction to obtain first microwave frequency signals through the optical processing and the electrical processing; each of the first microwave frequency signals has a stable frequency, phases of the first microwave frequency signals are synchronized.

2. The integrated source generation, transmission, and distribution system according to claim 1, wherein the central station unit comprises a photoelectric processing module, an electrical power divider, an electro-optical modulation module, a first wavelength division multiplexer, a second wavelength division multiplexer, a matching delay line, and a delay adjustment module,
    wherein the photoelectric processing module is configured to sequentially perform photoelectric conversion, signal combining, filtering and amplification on the first optical carrier radio frequency signal and the second optical carrier radio frequency signal to obtain microwave transmission signals;
    the electrical power divider comprises at least two output ports configured to divide the microwave transmission signals output by the photoelectric processing module into at least two branch microwave transmission signals; a first output port of the at least two output ports of the electrical power divider outputs a first branch microwave transmission signal to the electro-optical modulation module; the second output port of the at least two output ports of the electrical power divider outputs a second branch microwave transmission signal to the delay adjustment module;
    the electro-optical modulation module is configured to modulate a first optical signal of a first wavelength by the first branch microwave transmission signal to output a first modulated optical signal; and the electro-optical modulation module is configured to modulate a second optical signal of a second wavelength by the first branch microwave transmission signal to output a second modulated optical signal;
    the first wavelength division multiplexer is configured to perform wavelength selection, extract the first optical carrier radio frequency signal from a third optical signal input from an input end of the first wavelength division multiplexer, output the first optical carrier radio frequency signal to the photonic loop through a common end of the first wavelength division multiplexer, extract the second optical carrier radio frequency signal from a fourth optical signal received from the common end of the first wavelength division multiplexer, and output the second optical carrier radio frequency signal to the photoelectric processing module through an output end of the first wavelength division multiplexer;

the second wavelength division multiplexer is configured to perform wavelength selection, is configured to extract the second optical carrier radio frequency signal from a fifth optical signal input from an input end of the second wavelength division multiplexer, is configured to output the second optical carrier radio frequency signal to the delay adjustment module through a common end of the second wavelength division multiplexer, is configured to extract the first optical carrier radio frequency signal from a six optical signal received from the common end of the second wavelength division multiplexer, and is configured to output the first optical carrier radio frequency signal to the photoelectric processing module through an output end of the second wavelength division multiplexer;

the matching delay line is connected between the first wavelength division multiplexer and the photoelectric processing module, and the matching delay line is configured to realize an additional delay of the second optical carrier radio frequency signal; or, the matching delay line is connected between the second wavelength division multiplexer and the photoelectric processing module, and the matching delay line is configured to realize an additional delay of the first optical carrier radio frequency signal; so that the photonic loop has different transmission delays in the clockwise direction and the counterclockwise direction and dual-loop oscillation of the photonic loop is formed;

the delay adjustment module is configured to extract the time delay information and the phase information along the photonic loop from the second branch microwave transmission signal according to the external reference signal; the delay adjustment module is configured to adjust delays or phases of the first optical carrier radio frequency signal and the second optical carrier radio frequency signal transmitted in the photonic loop according to the time delay information and the phase information of the photonic loop.

3. The integrated source generation, transmission, and distribution system according to claim 2, wherein the photoelectric processing module comprises a first photodetector, a first band-pass filter, and a first electric amplifier;

wherein the first photodetector is a balanced photodetector and is configured to recover a first microwave recovery signal from the first optical carrier radio frequency signal from the second wavelength division multiplexer; the first photodetector is configured to recover a second microwave recovery signal from the second optical carrier radio frequency signal from the first wavelength division multiplexer; the first photodetector is further configured to combine the first microwave recovery signal and the second microwave recovery signal to output a combined microwave signal;

the first band-pass filter is configured to filter the combined microwave signal and output a filtered microwave signal; and the first electric amplifier is configured to amplify the filtered microwave signal and output the microwave transmission signal.

4. The integrated source generation, transmission, and distribution system according to claim 3, wherein the first band-pass filter is an electrical filter with an adjustable center frequency.

5. The integrated source generation, transmission, and distribution system according to claim 2, wherein the electro-optical modulation module comprises a first laser, a second laser, and a first modulator;

wherein the first laser is configured to output the first optical signal of the first wavelength;

the second laser is configured to output the second optical signal of the second wavelength; and the first modulator is configured to modulate the first optical signal of the first wavelength by the first branch microwave transmission signal to output the first modulated optical signal and modulate the second optical signal of the second wavelength by the first split microwave transmission signal to output the second modulated optical signal.

6. The integrated source generation, transmission, and distribution system according to claim 2, wherein the delay adjustment module comprises an adjustable delay line, a phase discriminator, and a controller;

wherein the adjustable delay line is connected to the common end of the first wavelength division multiplexer or the common end of the second wavelength division multiplexer; the adjustable delay line is configured to adjust an optical path delay amount of the photonic loop;

the phase discriminator is configured to receive the second branch microwave transmission signal and the external reference signal from an outside of the central station unit; the phase discriminator is configured to extract the time delay information and the phase information of the photonic loop from the second branch microwave transmission signal according to the external reference signal; and the controller is configured to adjust a time delay of the adjustable delay line according to the time delay information and the phase information of the photonic loop, so that the transmission delays of the photonic loop are kept stable.

7. The integrated source generation, transmission, and distribution system according to claim 2, wherein the central station unit further comprises a frequency multiplier; wherein the electrical power divider comprises three output ports configured to split the microwave transmission signal output by the photoelectric processing module into the first branch microwave transmission signal, the second branch microwave transmission signal, and a third branch microwave transmission signal; a third output port of the electrical power divider is configured to output the third branch microwave transmission signal to the frequency multiplier, the frequency multiplier doubles a frequency of the third branch microwave transmission signal to output a second microwave frequency signal; a frequency of the second microwave frequency signal is twice of a frequency of the microwave transmission signal.

8. The integrated source generation, transmission, and distribution system according to claim 1, wherein the photonic loop comprises at least one bidirectional optical amplifier unit; the at least one bidirectional optical amplifier unit is located between the central station unit and one of the subscriber station units adjacent to the central station unit or the at least one bidirectional optical amplifier unit is located between two adjacent subscriber station units.

9. The integrated source generation, transmission, and distribution system according to claim 8, wherein the subscriber station units comprise at least one first subscriber station unit adopting an optical receiving mode; the at least one first subscriber station unit comprises a first optical coupler, a third wavelength division multiplexing module, a third photoelectric detector, a third electric amplifier, a fourth wavelength division multiplexing module, a subscriber station optical amplifier, a third modulator, a fourth photoelectric detector, a third band-pass filter, and a fourth electric amplifier;

an input end of the first optical coupler is connected to the photonic loop; an output end of the first optical coupler is connected to the third wavelength division multiplexing module and the fourth wavelength division multiplexing module; an output end of the third wavelength division multiplexing module is connected to a third photoelectric detector; the third photoelectric detector is connected to a radio frequency port of a third modulator by the third electric amplifier; an output end of the fourth wavelength division multiplexing module is connected to an input port of a third modulator by the subscriber station optical amplifier; an output port of the third modulator is connected to the fourth photoelectric detector; the fourth photoelectric detector is connected to the fourth electric amplifier by the third band-pass filter.

10. The integrated source generation, transmission, and distribution system according to claim 8, wherein the subscriber station units comprise at least one second subscriber station unit adopting an electrical receiving mode; the at least one second subscriber station unit comprises a second optical coupler, a fifth wavelength division multiplexing module, a fifth photoelectric detector, a sixth wavelength division multiplexing module, a sixth photoelectric detector, a frequency mixer, a fifth band-pass filter, and a fifth electric amplifier;

an input end of the second optical coupler is connected to the photonic loop; an output end of the second optical coupler is connected to the fifth wavelength division multiplexing module and the sixth wavelength division multiplexing module; an output end of the fifth wavelength division multiplexing module is connected to the fifth photoelectric detector; an output end of the sixth wavelength division multiplexing module is connected to the sixth photoelectric detector; an output end of the fifth photoelectric detector and an output end of the sixth photoelectric detector are respectively connected to two input ports of the frequency mixer; an output end of the frequency mixer is connected to the fifth electric amplifier by the fifth band-pass filter.

* * * * *